(12) United States Patent
Balasubramani

(10) Patent No.: US 12,204,795 B2
(45) Date of Patent: Jan. 21, 2025

(54) ERROR DETECTION AND CORRECTION IN A CONTROLLER

(71) Applicant: Micron Technology, Inc., Boise, ID (US)

(72) Inventor: Muthazhagan Balasubramani, Singapore (SG)

(73) Assignee: Micron Technology, Inc., Boise, ID (US)

( * ) Notice: Subject to any disclaimer, the term of this patent is extended or adjusted under 35 U.S.C. 154(b) by 125 days.

(21) Appl. No.: 17/890,781

(22) Filed: Aug. 18, 2022

(65) Prior Publication Data

US 2024/0061614 A1 Feb. 22, 2024

(51) Int. Cl.
*G06F 3/06* (2006.01)
*G06F 11/08* (2006.01)

(52) U.S. Cl.
CPC .......... *G06F 3/0659* (2013.01); *G06F 3/0619* (2013.01); *G06F 11/08* (2013.01)

(58) Field of Classification Search
CPC .......................... G11C 13/0004; G11C 29/765
See application file for complete search history.

(56) References Cited

U.S. PATENT DOCUMENTS

| | | | |
|---|---|---|---|
| 9,317,317 B2 | 4/2016 | Graham et al. | |
| 9,459,908 B2 | 10/2016 | Anand et al. | |
| 11,042,302 B2 | 6/2021 | Benisty | |
| 2011/0041005 A1* | 2/2011 | Selinger | G11C 29/765 714/48 |
| 2019/0317696 A1* | 10/2019 | Jagadish | G06F 3/0679 |
| 2020/0066341 A1* | 2/2020 | McGlaughlin | G11C 13/0004 |
| 2020/0151054 A1* | 5/2020 | Shin | G06F 3/0679 |
| 2020/0301611 A1* | 9/2020 | Sia | G06F 3/0604 |
| 2020/0394103 A1* | 12/2020 | Schaefer | G06F 11/326 |
| 2021/0263645 A1 | 8/2021 | Benisty | |

* cited by examiner

*Primary Examiner* — Getente A Yimer
(74) *Attorney, Agent, or Firm* — Brooks, Cameron & Huebsch, PLLC (57) ABSTRACT

A host submits a command to a memory device, where a host status indicator (ID) for the host and a memory device status ID for the memory device are assigned with the command in at least one of a status command slot related to the command. An interrupt signal asserted during processing of the command is determined, where the interrupt signal is indicative of a change in at least one of the host status ID and the memory device status ID. After determining that the interrupt signal is asserted at least one of the host status ID and the memory device status ID are read. Based on the read information, a failure in at least one of the host and device is corrected prior to initiation of a timeout process.

42 Claims, 6 Drawing Sheets

| TOKEN ID | CURRENT STATUS |
|---|---|
| 1 | SQ DOORBELL WRITE SUCCESS |
| 2 | COMMAND FETCH SUCCESS |
| 3 | COMMAND FETCH FAILURE |
| 4 | PRP/SGL FETCH SUCCESS |
| 5 | PRP/SGL FETCH FAILURE |
| 6 | DATA TRANSFER SUCCESS |
| 7 | PRP/SGL FETCH FAILURE |
| 8 | POST CQ ENTRY SUCCESS |
| 9 | POST CQ FAILURE |
| 10 | POST INTERRUPT SUCCESS |
| 11 | POST INTERRUPT FAILURE |
| 12 | DEVICE WAITING FOR CQ DOORBELL WRITE |
| 13 | HOST WAITING FOR CQ ENTRY |
| 14 | HOST WAITING FOR INTERRUPT |
| 15 | HOST POST CQ DOORBELL WRITE |
| ... | ... |
| N | HOST VENDOR SPECIFIC FAILURES |
| N + 1 | DEVICE VENDOR SPECIFIC FAILURES |

ERROR DETECTION AND CORRECTION IN A CONTROLLER

TECHNICAL FIELD

Embodiments of the present disclosure relate generally to a controller for digital logic circuits, and more specifically, relate to error detection and correction in the controller.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

When a command failure occurs in a controller, the reason may not be completely apparent until someone is able to debug the error(s). Debugging a controller is a time consuming task. There is, therefore, a need in the art to detect and correct errors in a controller in a more efficient manner.

Aspects of the present disclosure are directed to a method and system for enablement of an "on-the-fly" error detection and correction mechanism in an NVMe (such as a solid-state drive (SSD)), which are attached through a peripheral component interconnect Express (PCIe) bus or switch. NVMe is the standardized host interface protocol. NVMe (non-volatile memory express) protocol is a standardized high-performance software communication interface between a host controller and a memory device protocol for managing PCIe SSDs, providing for thousand queues, each of which can have thousand simultaneous commands.

An example of a memory device is an SSD (solid-state device). An SSD can include multiple interface connections to one or more host computing devices (hereinafter referred to as a host). The interface connections can be referred to as ports. A host can send data commands (e.g., read, write, erase, program, etc.) to the SSD via a port. The ports can be physical and/or virtual ports (which may be referred to as physical functions and virtual functions, respectively). For example, a physical port may include a physical connection (e.g., a physical path such as a PCIe path) and a virtual port may include a virtual connection (e.g., a logical path such as a PCIe virtual function).

NVMe includes many features, including enhanced error reporting, logging, management, debug, and telemetry. For example, the NVMe specification provides various debug information about the failures, including Controller Fatal Status (CFS) register and Get Log Page Error information log, among others. This information may help the host device to understand the current failure at a high level but fails to give useful information about the failure in more command level or command slot granularity.

As a result, when a command failure occurs at a command level the host controller and/or the memory device are not aware of the reason, requiring human intervention to debug the situation. One reason for this is that the error code is not accessible and/or visible (i.e., transparent) between the host controller and the memory device. If such a situation existed, then there could be the option for an "on-the-fly" corrective mechanism. For instance, when a host device sends a command to the memory device that encounters a failure (e.g., transport level or a Protocol level or any device specific failures), it is possible the memory device will not respond to the command. It is also possible that the memory device may wait for a host response to the command, but the host device is dealing with some command failure which requires some additional action. In general, to recover from this situation, the host device or device memory relies on a time out handler (e.g., expiry of watchdog timer). As a result, the host device may simply issue a reset to the device to recover from the current failure state, even though the reasons for the failure were minor.

Aspects of the present disclosure address the above and other deficiencies by enabling additional debug information to be visible and available at the command level. This provides more transparency and rich debugging information to both the host device and the memory device, which allows for "on-the-fly" error detection and correction for the specific command slot. This provides both the host device and the memory device the ability to more quickly recover from specific error sequences without having to wait for action by the user. It also provides flexibility to both the host device and the memory device to detect and correct the failure immediately instead of resetting the complete subsystem (i.e., correction by a timeout handler). Such an approach can address multiple use cases such as failure during data transfer between the host device and the memory device, the host device or memory device can request to pause the command slot for a while, aborting the command slots, or retrying the command slot upon detecting the failure. The disclosure also helps provide a better validation environment for any first level analysis, for example, to analyze failures experienced by an SSD and/or by a host system in which the SSD is deployed.

Figure 1:
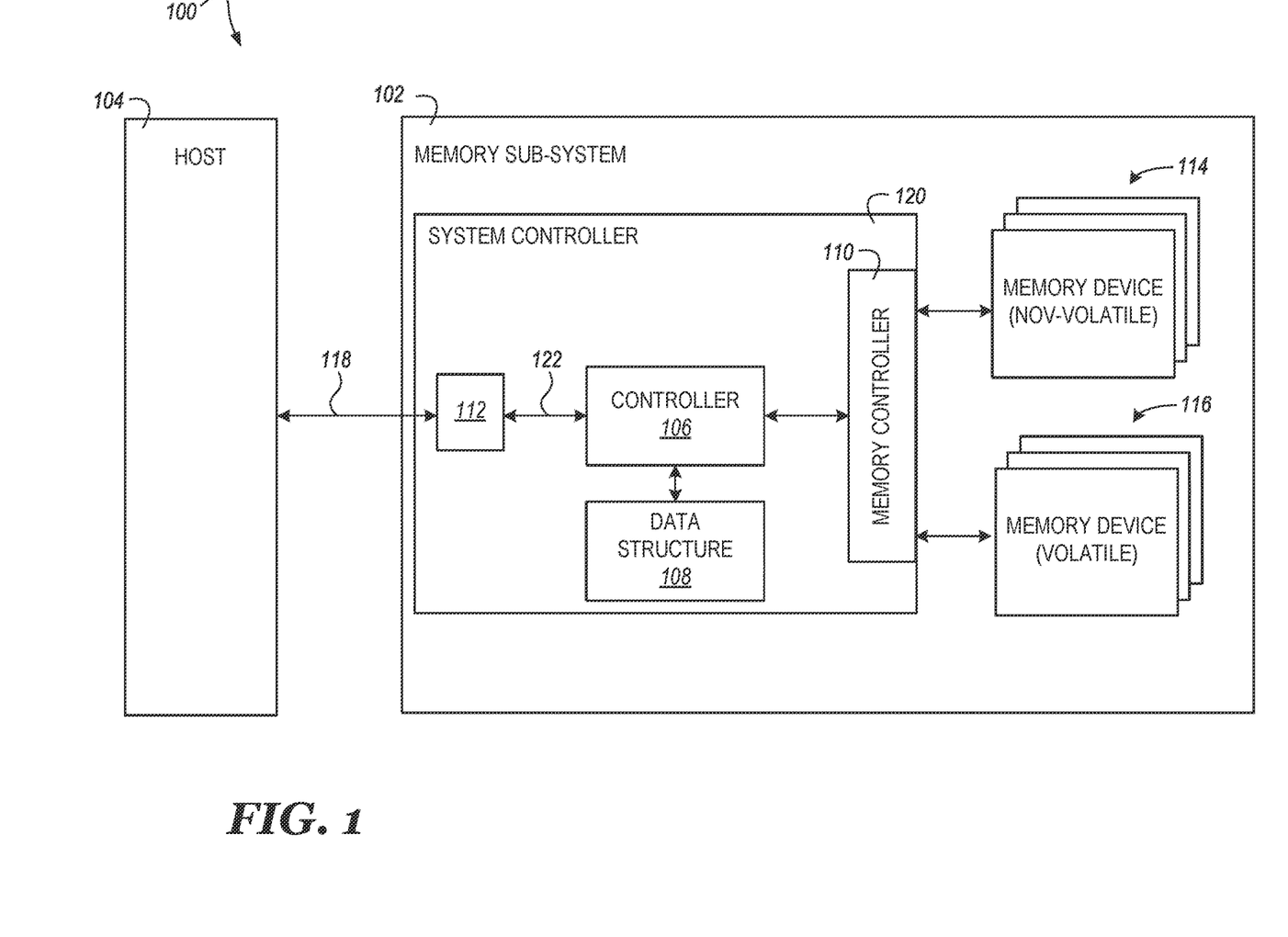
FIG. 1 is a block diagram of an apparatus in the form of a computing system including at least one host and at least one memory sub-system, in accordance with a number of embodiments of the present disclosure.

FIG. 1 is a block diagram of an apparatus in the form of a system 100 that includes a memory sub-system 102, in accordance with one or more embodiments of the present disclosure. An example of the memory sub-system 102 is an SSD. The system 100 can include one or more host computing devices (e.g., a host 104, which may include one or more host computing devices). One or more host computing devices are hereinafter referred to herein as the host 104. The host 104 can be a computing device such as a desktop computer, laptop computer, network server, mobile device, or such computing device that includes a memory device and a processing device. The host 104 can include or be coupled to the memory sub-system 102. The host 104 can write data to the memory sub-system 102 and/or read data from the memory sub-system 102. As used herein, memory sub-system 102, host 104, controller 106, data structure 108, memory controller 110, and/or port 112 might also be separately considered an "apparatus." The memory sub-system 102 can include, among other things, both non-volatile memory devices 114 and/or volatile memory devices 116, as provided herein.

System 100 includes memory sub-system 102 (e.g., an SSD) communicatively coupled to host 104. A port 112 of the memory sub-system 102 can communicatively couple the memory sub-system 102 to the host 104 via communication link 118 (e.g., a cable, bus, etc.), which may be referred to herein as a "command path." As used herein, a "port" may be a physical port (e.g., a port configured to send and/or receive data via a physical function) or a virtual port (e.g., a port configured to send and/or receive data via a virtual function).

FIG. 1 illustrates various components of a memory sub-system 102, including a system controller 120, the port 112 (e.g., a number of ports), and the non-volatile memory device 114 (e.g., a number of non-volatile memory devices 114) and/or the volatile memory device 116 (e.g., a number of volatile memory devices 116) which can serve as a storage volume for the system 100. In some embodiments each of the non-volatile memory devices 114 and the volatile memory devices 116 can be coupled to the system controller 120 via one or more number of channels as indicated by the arrows connecting the memory controller 110 to the non-volatile memory devices 114 and the volatile memory devices 116.

The memory sub-system 102 can include non-volatile memory device(s) 114. For example, the non-volatile memory devices 114 may be a negative-and (NAND) type flash memory. Each of the non-volatile memory devices 114 may include one or more arrays of memory cells such as single level cells (SLCs), multi-level cells (MLCs), or quad-level cells (QLCs). Each of the memory cells may store bits of data (e.g., data blocks) used by the host computing device 104. The memory cells of the non-volatile memory devices 114 may be grouped as memory pages or data blocks that may refer to a unit of the memory device used to store data.

The memory sub-system 102 can also include volatile memory device(s) 116. For example, the volatile memory devices 116 may be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, and electrically erasable programmable read-only memory (EEPROM). Each of the memory cells may store bits of data (e.g., data blocks) used by the host computing device 104.

The host 104 can be coupled to the memory sub-system 102 via a physical host interface, which is also referred to as a communication link 118. Examples of a physical host interface 118 include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface 118 may be used to transmit data between the host computing device 104 and the memory sub-system 102. The host computing device 104 may further utilize an NVM Express (NVMe) interface protocol to access the non-volatile memory devices 114 and volatile memory devices 116 when the memory sub-system 102 is coupled with the host computing device 104 by the PCIe interface.

The memory sub-system 102 can be capable of pipelined command execution in which multiple commands are executed, in parallel, on the memory sub-system 102. The memory sub-system 102 can have multiple command paths (hereinafter referred to as paths) to the non-volatile memory devices 114 and volatile memory devices 116. For example, the memory sub-system 102 may be a multi-channel memory sub-system that may have multiple physical PCI Express (PCIe) paths to the non-volatile memory devices 114 and volatile memory devices 116. In another example, the memory sub-system 102 may use single root input/output virtualization (SR-IOV) with multiple virtual functions (VFs) that act as multiple logical paths to the non-volatile memory devices 114 and volatile memory devices 116.

The physical host interface 118 may comprise a plurality of links used to communicate information between the memory sub-system 102 and a number of hosts such as host 104. The host 104 may be configured to send and/or receive commands and/or data to the memory sub-system 102, or the memory sub-system 102 may be configured to process commands and/or data received from the host 104 and/or send the processed commands and/or data back to the host 104. System 100 can be, for example, a laptop computer, a personal computer, digital camera, digital recording and/or playback device, mobile telephone (e.g., a smartphone), memory card reader, tablet, phablet, personal digital assistant, interface hub, sensors, Internet-of-Things (IoT) enabled device, among other computing devices.

The host 104 can include a number of processing resources (e.g., one or more processors) capable of accessing the memory sub-system 102. As an example, host 104 may itself be a computing device capable of accessing the memory sub-system 102 via a communication link 118. According to one or more embodiments, the memory sub-system 102 can be configured as an external, or portable, SSD for system 100 (e.g., with plug-in connectivity).

The system controller 120 can communicate with the non-volatile memory devices 114 and volatile memory devices 116 to operate (e.g., read, write, erase, etc.) the non-volatile memory devices 114 and volatile memory devices 116. The system controller 120 can be used to manage communications with, and the data stored in, the non-volatile memory devices 114 and volatile memory devices 116. System controller 120 can be implemented in the form of hardware, firmware, and/or software. For example, system controller 120 can comprise a number of discrete circuitry components.

The communication protocol between the host 104 and the memory sub-system 102 may be different than what is required for accessing a memory device (e.g., non-volatile memory devices 114 and volatile memory devices 116). System controller 120 can include control circuitry configured to translate commands received from the host 104 into appropriate commands to accomplish the intended operation of the non-volatile memory devices 114 and volatile memory devices 116. The system controller 120 can provide a translation layer between the host 104 and the memory sub-system 102. System controller 120 can also process host command sequences, the associated data, and other information (e.g., signals) to appropriate channel command sequences, for example, to store and retrieve data. System controller 120 can selectively distribute commands, communicate (e.g., receive, send, transmit) associated data, and other information, through an appropriate channel to a corresponding memory device of the non-volatile memory devices 114 and/or the volatile memory devices 116.

In some embodiments, the system controller 120 (or a portion thereof) may be provided as a system on a chip. For example, the system controller 120 may be provided as part of an application specific integrated circuit (ASIC), or as part of a field-programmable-gate-array (FPGA), or other suitable system on a chip. The system controller 120 includes a controller 106, which is communicatively coupled to port 112 and data structure 108. As used herein, a "data structure" refers to a specialized format for organizing and/or storing data, which may or may not be organized in rows and columns. Examples of data structures include arrays, files, records, tables, trees, etc.

Controller 106 may be configured to control operation of the system controller 120. For example, the controller 106 may be configured to control movement of commands and/or data between the host 104 and the memory controller 110. For instance, the controller 106 may be configured to process commands transferred between the host 104 and the non-volatile memory devices 114 and volatile memory devices 116 via memory controller 110. In some embodiments, controller 106 may be a non-volatile memory express (NVMe) controller. For example, the controller 106 may be configured to operate in accordance with a logical device interface specification (e.g., protocol) such as the NVMe specification or a non-volatile memory host controller interface specification. Accordingly, in some embodiments, the controller 106 may be configured to process commands and/or data according to the NVMe protocol.

The controller 106 may be coupled to the port 112 via command path 122. Command path 122 may be a physical path (e.g., a wire or wires) that may be configured to pass physical functions and/or virtual functions between the port 112 and the controller 106 in accordance with the NVMe standard. For example, in a single root input/output virtualization (SR-IOV) deployment, controller 106 can serve as multiple controllers (e.g., NVMe controllers) for respective physical functions and/or each virtual functions, such that controller 106 provides multiple controller operations.

The system controller 120 includes a memory controller 110 coupled to the controller 106. The memory controller 110 may be configured to control operation of the non-volatile memory devices 114 and volatile memory devices 116. In some embodiments, the memory controller 110 may be a flash memory controller such as a NAND flash controller, or other suitable controller.

For the various embodiments, the controller 106, as discussed herein, is configured to receive respective commands (e.g., one or more commands) from the host computing device 104. Each respective command, in turn, comprises a command portion (e.g., for executing the command) and a status indicator portion, which indicates a status of the host 104 and of the memory device 114 and/or the memory device 116 (e.g., as either in an error state or not in an error state, or various states therebetween). The controller 106 further allocates command slots the memory device(s) 114/116 to store the status indicator information associated with the respective commands. For the various embodiments, the status indicator portion comprises either a host status indicator (ID) (e.g., for the status of the host 104) or a device status ID (e.g., for the status of the memory device(s) 114/116).

When an error state occurs in either the host 104 and/or the memory sub-system 102, the controller 106 determines that an interrupt signal (e.g., an error) is asserted during processing of at least one of the respective commands. The interrupt signal is indicative of a change in at least one status indicator portion of at least the one of the respective commands. The controller 106 can then read the at least the one status indicator portion of at least the one of the respective commands that experienced the change responsive to the interrupt signal. For the various embodiments, the controller 106 can read the status indicator portion of at least the one of the respective commands by accessing a base address register region of the system 100 (e.g., of the system controller 120). As the status indicator portion of at least the one of the respective commands is now visible, the controller 106 can cause the failure associated with the command slot allocated to at least the one of the respective commands to be resolved prior to initiation of a timeout process by the host 104.

Figure 2:
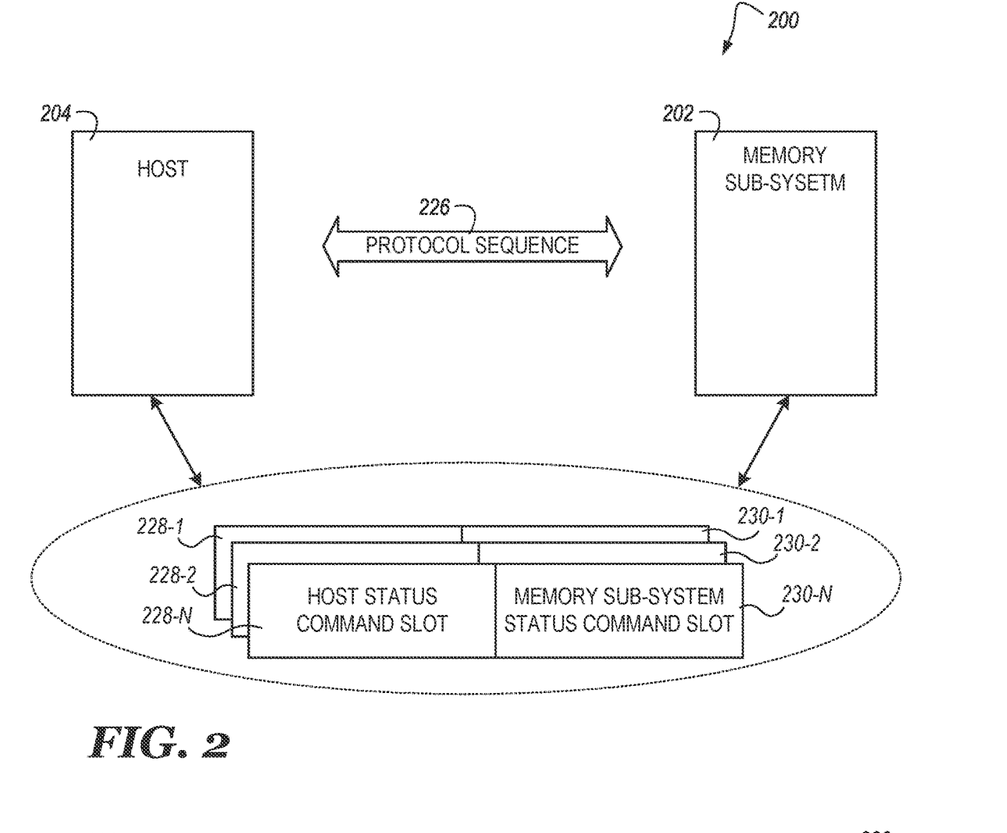
FIG. 2 is a block diagram of an apparatus in the form of a computing system including at least one host and at least one memory sub-system, in accordance with a number of embodiments of the present disclosure.

FIG. 2 is a block diagram of a system 200 that includes both the host 204 and the memory sub-system 202, both as previously discussed, which are configured to exchange data and information via a protocol sequence 226. As discussed herein, examples of such a protocol sequence 226 include NVMe. As noted herein, NVMe specification provides various debug information about failures, such as Controller Fatal Status (CFS) register, Get Log Page Error information log, etc.

In addition to such debug information, the present disclosure provides for additional debug information to be provided about a failure at the command slot level of both the host 204 and the memory sub-system 202. This additional debug information comes in the form of the status indicator portion, as discussed herein, which indicates the respective status of the host 204 and of the memory devices 114/116 for each command (e.g., as either in an error state or not in an error state). For the various embodiments, the status indicator portion is the host status ID for the status of the host 204 for a given command and the device status ID (e.g., for the status of the memory devices 114/116) for the given command.

Such information can be provided for each command in the command slots associated with the host 204 and the memory devices 114/116. As shown in FIG. 2, the host 204 and the memory sub-system 202 each include a plurality of command slots, where each command slot (e.g., the host status command slot 228 and the memory sub-system command slot 230) it is associated with and provides the status (in the form of metadata) on the currently executing command submitted by the host 204 to the memory sub-system 202 for the respective slot. For example, the host 204 includes host status command slots 228-1 through 228-N, while the memory sub-system 202 includes memory sub-system status command slots 230-1 through 230-N for corresponding commands 1 through N submitted by the host 204 to the memory sub-system 202. The command slots 228-1 through 228-N and 230-1 through 230-N may each comprise a number of storage locations (e.g., a number of addressable memory locations to store commands) to service commands received from the host 204. For the various embodiments, the host 204 and memory sub-system 202 keeps the above described additional metadata information about the command for every command slot, where it is made accessible to both the host 204 and the memory sub-system 202 without compromising the performance of the system.

Figure 3:
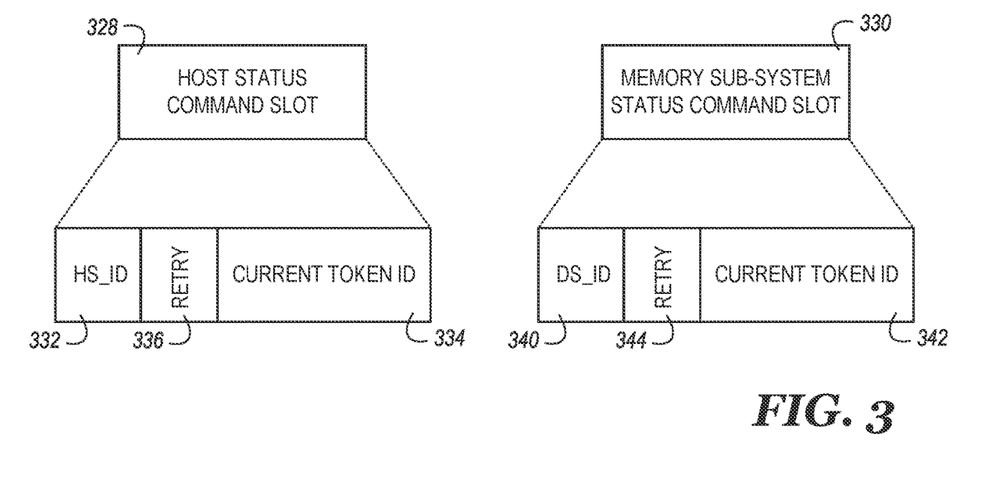
FIG. 3 is a block diagram of a host command slot and a memory sub-system command slot in accordance with a number of embodiments of the present disclosure.
Figure 4:
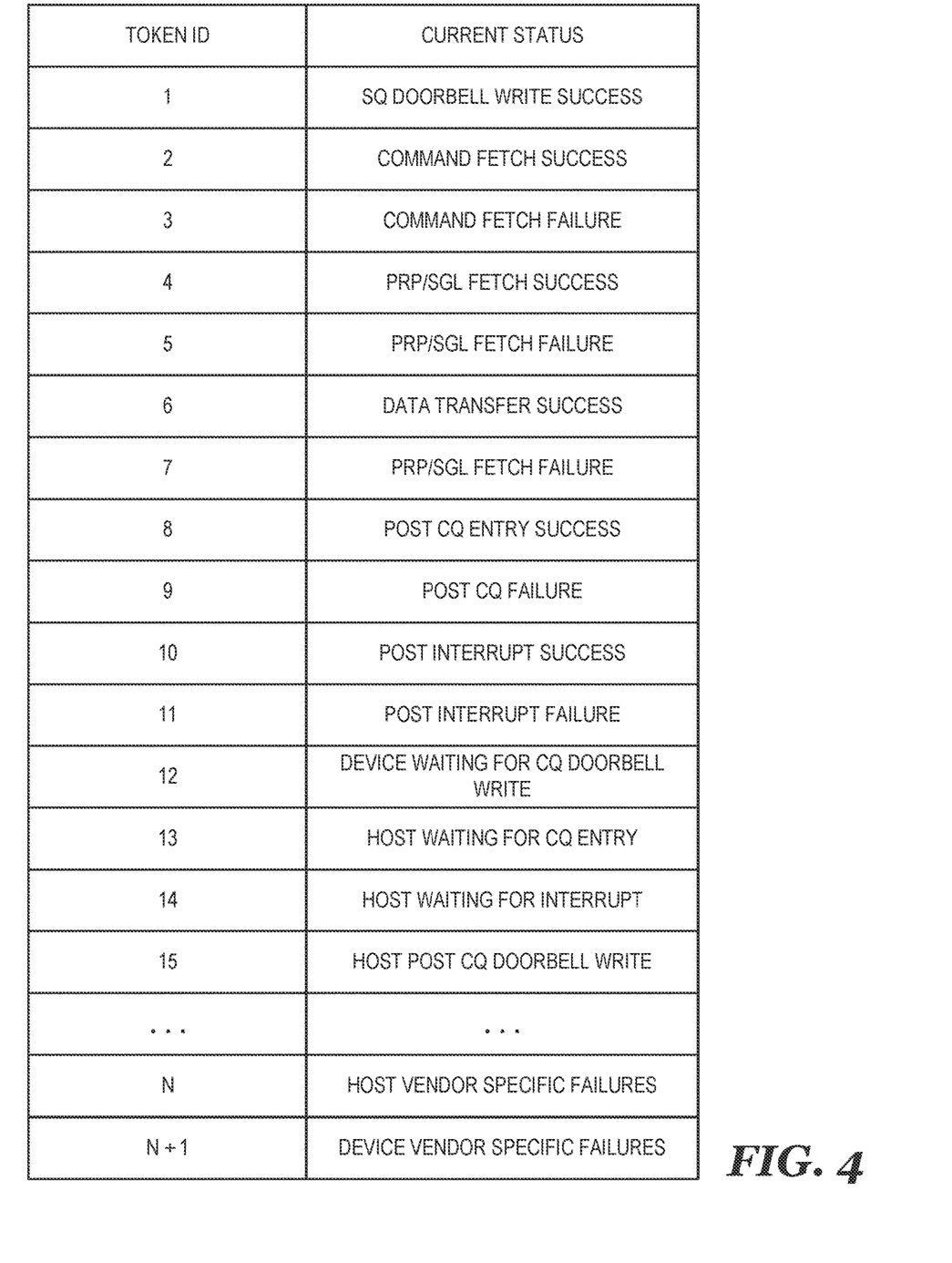
FIG. 4 is a table of token IDs in accordance with a number of embodiments of the present disclosure.

FIG. 3 provides an illustration of the information contained in each of the command slots. For example, for a given command, each of the associated host status command slot 328 and the memory sub-system status command slot 330 include, among other things, the status indicator (the aforementioned "additional debug information") for the host and memory sub-system for the respective command of the command slot. As illustrated, host status command slot 328 includes the host status ID 332 along with a current token ID 334 and a retry bit 336 (if required by the token ID 334 to retry the specific sequence). Similarly, memory sub-system status command slot 330 includes the device status ID 340 along with a current token ID 342 and a retry bit 344 (if required by the token ID 342 to retry the specific sequence). A table of the token IDs for 334 and 342 is seen in FIG. 4. For the various embodiments, the token ID points to a specific error type, where the host and the device can have either the same or a different token ID for a given command at the same point of time.

Regarding the retry bit 336 and/or 344, an example would include a situation where, for a given command, the host 204 is waiting for an interrupt where the Token ID 334 in Host Status Command Slot 328 is 14 (as seen in FIG. 4). After posting the interrupt, the token ID 342 of the memory sub-system command slot 330 will be 15, which is to wait for CQ Doorbell ring (as seen in FIG. 4). In this way, both the host 204 and the memory sub-system 202 can track the complete life cycle of a command from beginning to end, which until this point has not been done.

Referring again to FIG. 1, the controller 106 may be configured to allocate the command slots (e.g., memory sub-system status command slots 230-1 through 230-N) in the data structure 108 to each function of the system 100. Similarly, the host 204 can include a host operating system that implements a driver (e.g., NVMe driver) to allocate the command slots (e.g., host status command slots 228-1 through 228-N) in a host memory data structure (either deployed on the host 204 or on the memory sub-system 202) to each function of the system 100.

Figure 5:
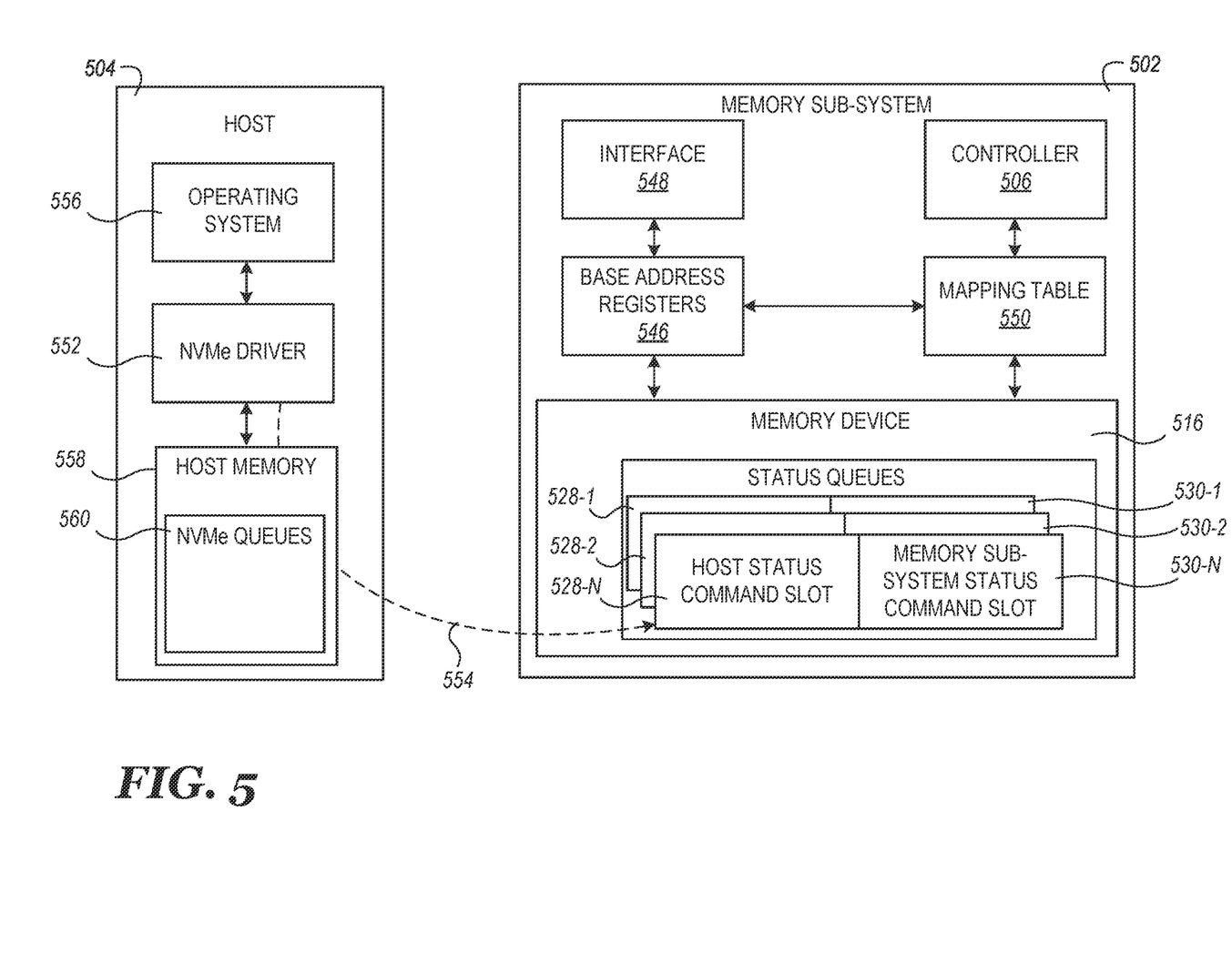
FIG. 5 is a block diagram of an apparatus in the form of a computing system including at least one host and at least one memory sub-system, in accordance with a number of embodiments of the present disclosure.

FIG. 5 provides an example of the above situation. FIG. 5 is a block diagram of an apparatus in the form of a system 500 that includes a memory sub-system 502, in accordance with one or more embodiments of the present disclosure. The system 500 includes host 504, as previously discussed, where the host 504 can include or be coupled to the memory sub-system 502. The host 504 can write data to the memory sub-system 502 and/or read data from the memory sub-system 502. The memory sub-system 502 can be analogous to the memory sub-system 102 illustrated in FIG. 1, herein. As used herein, memory sub-system 502, host 504, memory device 516, controller 506, mapping table 550, which can be a data structure, such as the 108 illustrated in FIG. 1, interface 548, which can be a port, such as the port 112 illustrated in FIG. 1, and/or base address registers 546 might also be separately considered an "apparatus." Memory sub-system 502 further includes memory device(s), such as the memory devices 114 and 116 illustrated in FIG. 1, which include, among other things, both non-volatile memory devices and/or volatile memory devices, as provided herein. In the non-limiting example illustrated in FIG. 5, the memory sub-system 502 is illustrated as including a volatile memory device 516 so as not to obfuscate the drawings. However, similar to the memory sub-system 102 of FIG. 1, the memory sub-system 502 can include non-volatile memory devices that can be operated in a similar manner as the volatile memory device 516.

As illustrated in FIG. 5, the memory sub-system 502 includes, among other things, the controller 506 and the memory device 516, as discussed herein. The memory sub-system 502 further includes base address registers 546 with the associated interface 548 and mapping table 550 for the base address registers 546. The base address registers 546 provides an index into the connected memory-mapped resource (e.g., address space that can be accessed by PCIe, which can either transmit data in or can write received data in the base address registers 546). The interface 548 provides access to debug components registers, such as processor debug logic, embedded trace microcell (ETM), and/or trace port registers, among other registers associated with debugging operations. The mapping table 550 provides the memory cell addresses (a map of the logical or physical address of operating memory cells) necessary for interacting with (providing information between) both the base address registers 546 and the memory devices (e.g., the volatile memory devices 516).

The host 504 can be coupled to the memory sub-system 502 via a physical host interface, as discussed herein, where the host 504 may further utilize an NVMe driver 552, which provides an interface protocol 554 to access the volatile memory devices 516 when the memory sub-system 502 is coupled with the host computing device 504 by the PCIe interface.

The host 504 further includes an operating system 556, which allows for host 504 interaction with, among other things, the NVMe driver 552. The NVMe driver 552 also interacts with host memory 558, where the host memory 558 supports NVMe queues for each of the respective commands sent to the memory sub-system 502. NVMe queues 560 of the host 504 can trigger a doorbell register when the command is ready to execute, where the controller 506 picks up the queue entries in the order received, or in the order of priority.

The controller 506 receives the respective commands from the host 504, where each respective command comprises a command portion and a status indicator portion as discussed herein. From each command there is generated an NVMe queue entry in the NVMe Queues 560, where each of the NVMe queue entries are associated with one status queue entries, which is allocated and maintained in the memory device 516 as status queues. To accomplish this, the controller 506 allocates command slots in the memory device (e.g., the volatile memory device 516) to allow the status indicator information associated with the respective commands to be stored in the status queues associated with each of the commands.

As discussed herein, the status indicator portion comprises the host status ID or the device status ID, which are shown in FIG. 3. To create and initialize the host status ID and the device status ID for the status queues, the host 504 and the memory sub-system 502 and/or the memory device 516 may use vendor specific command approach to create and initialize these queues. In some embodiments, the controller 506 can also utilize a vendor specific command in the status indication portion (e.g., the device status ID) associated with the respective commands of the status queue. These status queues can be exposed to the host 504 through the base address registers 546, which allows the host 504 to read the host 504 and the memory device 516 metadata information or to write host 504 metadata information about the specific command. The host 504 may, however, need to preform additional reading and writing to the command slots on the memory sub-system 502 for every command request. But this can be configured to occur during a failure scenario so as to better avoid a performance bottleneck.

As seen in FIG. 5, the status indicator portion in the memory sub-system command slots 530-1 through 530-N of the memory device 516 include, for each command, both the host status ID (contained in the host status command slot 528-1-528-N for the controller 506) and the memory device status ID (contained in the memory sub-system status command slot 530-1-530-N for the memory sub-system 502). In other words, the status indicator portion in the memory command slots of the memory device 516 includes both the host status ID and a memory device status ID for the memory for each command.

According to the present disclosure, the controller 506 can determine that an interrupt signal is asserted during processing of at least one of the respective commands, where the interrupt signal is indicative of a change in at least one status indicator portion of at least the one of the respective commands. For example, when the controller 506 in processing at least one of the respective commands determines that the interrupt signal is asserted by the controller 506, the controller 506 changes the host status ID for the at least one of the respective commands. This can be accomplished because the host 504 NVMe driver 552 maps the status queues and starts updating the host status command slot 528 based on token ID configuration for every command. The controller 506 maps address information associated with the allocated command slots, and more specifically, the status command slots 528 in the base address registers 546. In this way, the base address registers 546 can be considered a pseudo lookup table to map the status command slots 528 for quick location. Similarly, when the memory sub-system 502 determines that the interrupt signal is asserted, the memory sub-system 502 causes the change in the memory device status ID. In other words, the device updates the device status command slot based on token ID configuration for every command.

The controller 506 then reads at least the one status indicator portion of at least the one of the respective commands that experienced the change responsive to the interrupt signal. For the various embodiments, the controller 506 reads the memory device status ID by accessing the base address register 546 region of the memory sub-system 502 after the interrupt signal is asserted during processing of at least one of the respective commands. The controller 506 reads the memory device status ID by accessing a base address register region 546 of the memory sub-system 502 after the interrupt signal is asserted during processing of at least one of the respective commands. For the various embodiments, the controller 506 makes the change in at least one status indicator portion of at least the one of the respective commands by accessing a base address register region 546.

The controller 506 then causes a failure associated with a command slot allocated to at least the one of the respective commands to be resolved prior to initiation of a timeout process by the host computing device 504. For the various embodiments, the controller 506, in causing the failure associated with the command slot to be resolved prior to initiation of a timeout process, uses an interrupt handler to correct the failure.

Figure 6:
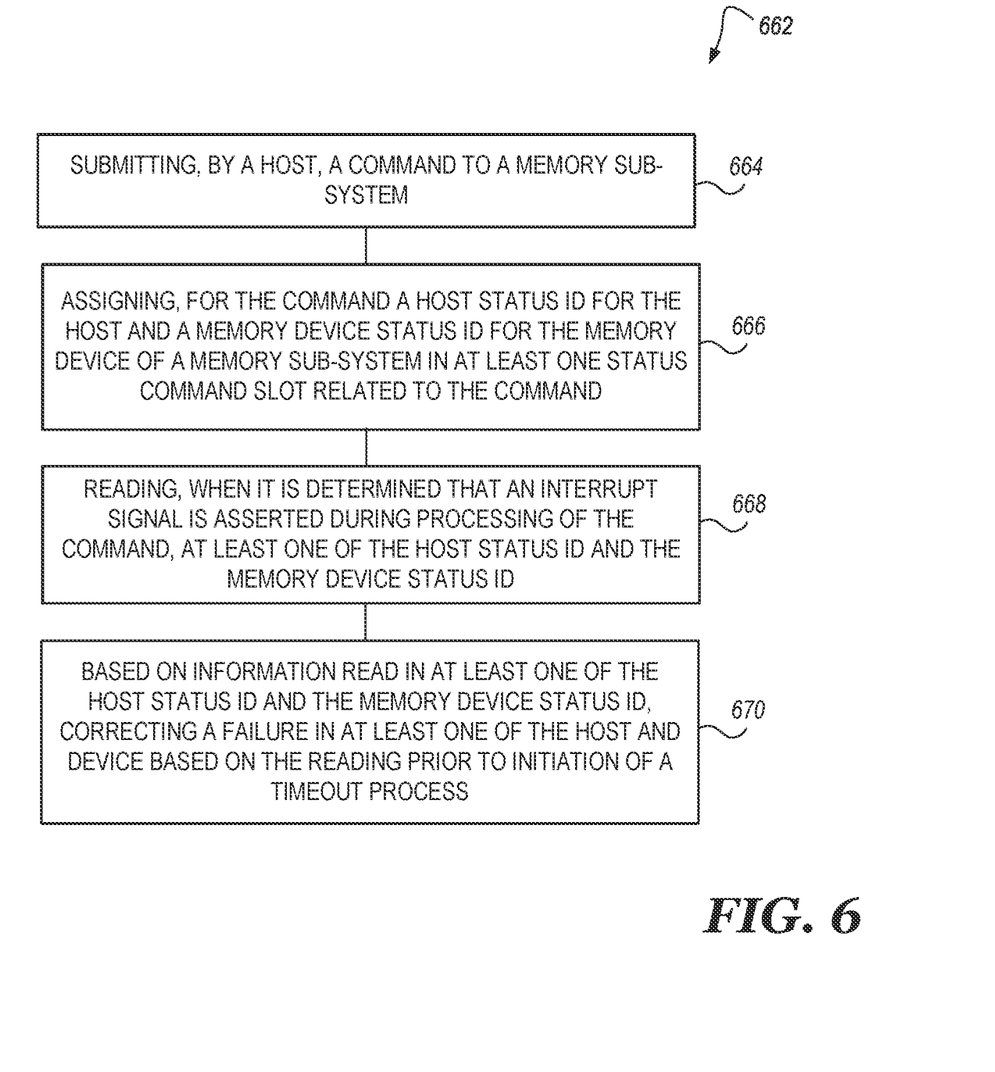
FIG. 6 is a flow diagram of in accordance with a number of embodiments of the present disclosure.

FIG. 6 provides a method 662 according to the present disclosure, where both the host status command slot and the device status command slot are at the device memory (e.g., 516) and are accessed by the host (e.g., 504) over the PCIe base address register (e.g., 546). For the method 662, the host, as provided herein, submits a command to the memory device at 664. Each of the NVMe queue entries are associated with one status queue entries, which is allocated and maintained in the device as a status queue. In order to create and initialize the status queue, host and device may use vendor specific command approach to create and initialize these queues in the host status command slot and the memory sub-system status command slot.

At 666, for the command a host status ID for the host and the memory device status ID for the memory device of the memory sub-system are assigned in at least one of a status command slot related to the command. In the present embodiment, the at least one of the status command slot related to the command is the memory device status command slot, where assigning the host status ID and the memory device status ID are both done in the memory device status command slot (e.g., as seen in FIG. 5). These status queues can be exposed to host via the base address registers, for Host to do read host/device metadata information or write host metadata information about the specific command. The host and the memory device can exchange list of available token IDs, via the base address register, using Vendor specific command and configures the tokens to be enabled or disabled. The host then creates the status queues and associate NVMe queues using the Vendor specific commands. In addition, the memory device allocates memory for each status queue and exposes them via the base address register. The host NVMe driver memory maps the status queues and starts updating the Host Status Command Slot based on token id configuration for every command. The device updates the Device Status Command Slot based on token id configuration for every command.

At 668, when it is determined that an interrupt signal is asserted during processing of the command (e.g., interrupt signal is indicative of a change in at least one of the host status ID and the memory device status ID), at least one of the host status ID and the memory device status ID is read. Reading the at least one of the host status ID and the memory device status ID after the interrupt signal can involve accessing the base address register region of the memory device, as discussed above for FIG. 5. In doing this, the host may have to perform additional memory read/write to these command slots for every command request, but this can be configurable to do read/write only during the failure scenario to avoid any performance bottleneck. At 670, based on information read in at least one of the host status ID and the memory device status ID, the failure is corrected in at least one of the host and device based on the reading prior to initiation of a timeout process.

Figure 7:
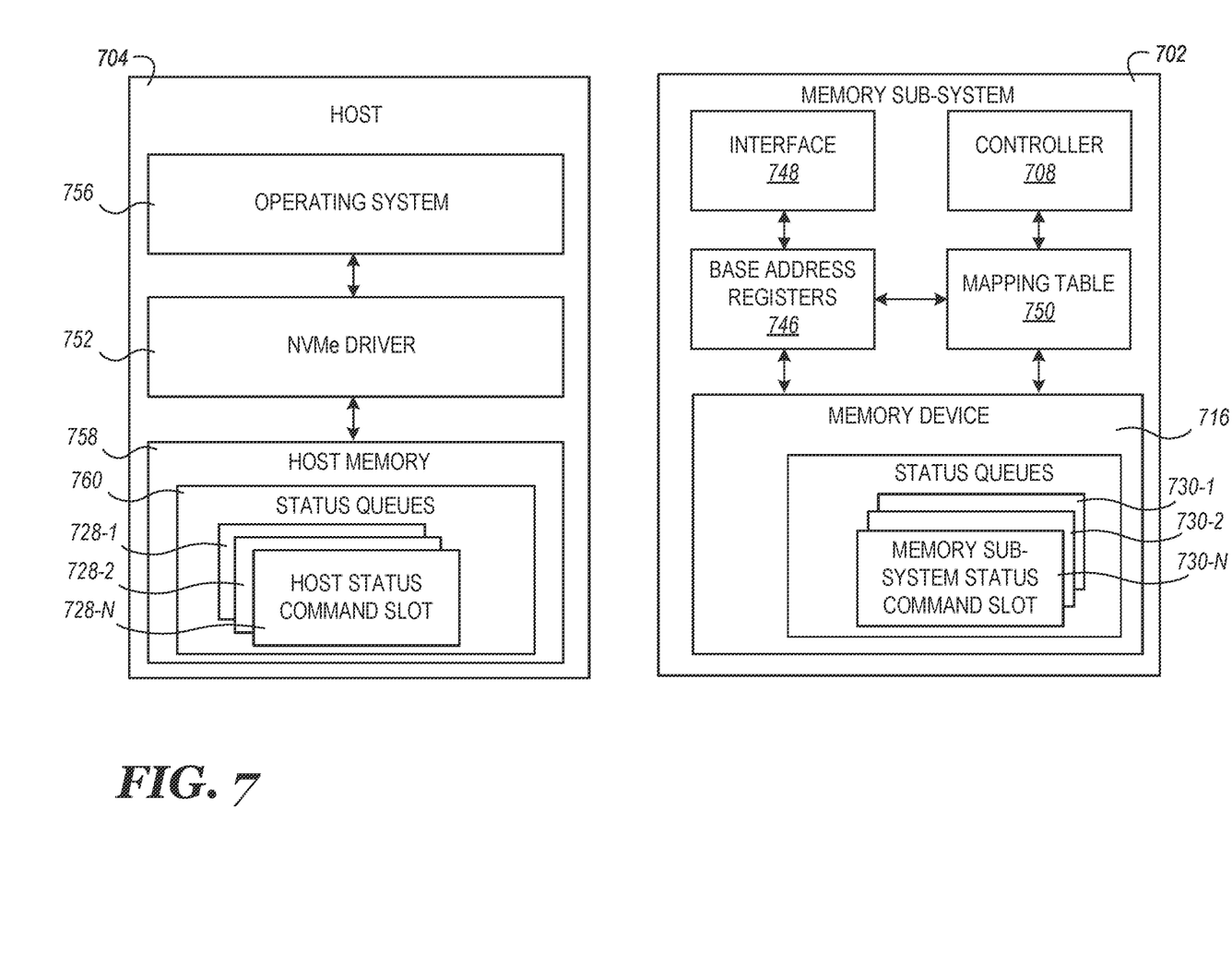
FIG. 7 is a block diagram of an apparatus in the form of a computing system including at least one host and at least one memory sub-system, in accordance with a number of embodiments of the present disclosure.

A method according to the present disclosure can include, where both the host status command slots (e.g., 728) are at the host (e.g., 704) and the device status command slots (e.g., the memory sub-system status command slots 730) are at the device memory (e.g., the memory device 716 of the memory sub-system 702). The host can access the device status command slots via the base address register (e.g., 746) and the memory sub-system can access the host status command slots via a PCIe interface (e.g., as part of performance of a memory read operation). In some embodiments, the host submits a command to the memory device, as described above. The command can be written to one of the NVMe queues. Each of the NVMe queue entries are associated with one status queue entries, which is allocated and maintained in the device as a status queue. In order to create and initialize the status queue, host and device may use a vendor specific command approach to create and initialize these queues in the host status command slot and the memory sub-system status command slot.

As for the command, a host status ID and the memory device status ID related to the command are assigned in at least one of the status command slots (e.g., in the host status command slots 728 and/or in the memory sub-system status command slots 730). In the presently described embodiment, the at least one of the status command slots related to the command is the memory device status command slot. The host creates host status queues in host memory while the memory sub-system creates device status queues in the memory sub-system. The host and/or the memory sub-system can associate various commands to the status queues using a vendor specific protocol and/or command. Assigning the host status ID is done in the host device status command slot while assigning the memory device status ID is done in the memory device status command slot (e.g., as seen in FIG. 7). The host status queues are exposed to the memory sub-system via a PCIe memory interface to, for example, facilitate memory accesses (e.g., reads, writes, etc.) involving the memory sub-system. In such embodiments, the device status queues are exposed to the host via a base address register (e.g., the base address registers 746) portion of the memory sub-system. The host and the memory device can exchange a list of available token IDs (e.g., the token IDs illustrated in FIG. 4), via the base address register, using vendor specific commands and/or according to a vendor specific protocol and can configure the token IDs and/or corresponding tokens to be enabled or disabled. In some embodiments, the host sends the vendor specific commands to the memory sub-system to initialize and create the device status queues and can associate the device status queues with respective NVMe queues (e.g., the NVMe queues 560 illustrated in FIG. 5). In addition, the memory device allocates memory for each status queue and exposes the status queues (e.g., the device status queues) via the base address register. The host NVMe driver memory maps the status queues and starts updating the host status command slot based on token id configuration for every command. The device updates the device status command slot based on a token id configuration for every command.

So, for the various embodiments, each of the host status queue slots points to one Host Status command slot, hence for every command request, the host updates the current status in the host status command slot. Likewise, each of the device status queue slots points to one device status command slot. Hence for every command request, the device updates the current status in the device status command slot.

When it is determined that an interrupt signal is asserted during processing of the command (e.g., interrupt signal is indicative of a change in at least one of the host status ID and the memory device status ID), at least one of the host status ID and the memory device status ID is read. Reading the at least one of the host status ID and the memory device status ID after the interrupt signal can involve accessing the base address register region of the memory device, as discussed above for FIG. 7. In doing this, the host may have to perform additional memory read/write to these command slots for every command request, but this can be configurable to do read/write only during the failure scenario to avoid any performance bottleneck. In some embodiments, based on information read in at least one of the host status ID and the memory device status ID, the failure is corrected in at least one of the host and device based on the reading prior to initiation of a timeout process.

FIG. 7 provides an additional example of a situation in which, in reference to FIG. 1 and FIG. 2, the controller 106 may be configured to allocate the command slots (e.g., memory sub-system status command slots 230-1 through 230-N) in the data structure 108 to each function of the system 100. Similarly, the host 204 can include a host operating system that implements a driver (e.g., NVMe driver) to allocate the command slots (e.g., host status command slots 228-1 through 228-N) in a host memory data structure, deployed on the host 204 to each function of the system 100.

Like FIG. 5, FIG. 7 is a block diagram of an apparatus in the form of a system 700 that includes a memory sub-system 702, in accordance with one or more embodiments of the present disclosure. The system 700 includes host 704, as previously discussed, where the host 704 can include or be coupled to the memory sub-system 702. The host 704 can write data to the memory sub-system 702 and/or read data from the memory sub-system 702. The memory sub-system 702 can be analogous to the memory sub-system 102 illustrated in FIG. 1, herein. As used herein, memory sub-system 702, host 704, memory device 716, controller 706, mapping table 750, which can be a data structure, such as the 108 illustrated in FIG. 1, interface 748, which can be a port, such as the port 112 illustrated in FIG. 1, and/or base address registers 746 might also be separately considered an "apparatus." Memory sub-system 702 further includes memory device(s), such as the memory devices 114 and 116 illustrated in FIG. 1, which include, among other things, both non-volatile memory devices and/or volatile memory devices, as provided herein. In the non-limiting example illustrated in FIG. 7, the memory sub-system 702 is illustrated as including a volatile memory device 716 so as not to obfuscate the drawings. However, similar to the memory sub-system 102 of FIG. 1, the memory sub-system 502 can include non-volatile memory devices that can be operated in a similar manner as the volatile memory device 516.

As illustrated in FIG. 7, the memory sub-system 702 includes, among other things, the controller 706 and the memory device 716, as discussed herein. The memory sub-system 702 further includes base address registers 746 with the associated interface 748 and mapping table 750 for the base address registers 746. The base address registers 746 provides an index into the connected memory-mapped resource (e.g., address space that can be accessed by PCIe, which can either transmit data in or can write received data in the base address registers 746). The interface 748 provides access to debug components registers, such as processor debug logic, embedded trace microcell (ETM), and/or trace port registers, among other registers associated with debugging operations. The mapping table 750 provides the memory cell addresses (a map of the logical or physical address of operating memory cells) necessary for interacting with (providing information between) both the base address registers 746 and the memory devices (e.g., the volatile memory devices 716).

The host 704 can be coupled to the memory sub-system 702 via a physical host interface, as discussed herein, where the host 704 may further utilize an NVMe driver 752, which provides an interface protocol 754 to access the volatile memory devices 716 when the memory sub-system 702 is coupled with the host computing device 704 by the PCIe interface.

The host 704 further includes an operating system 756, which allows for host 704 interaction with, among other things, the NVMe driver 752. The NVMe driver 752 also interacts with host memory 758, where the host memory 758 supports NVMe queues for each of the respective commands sent to the memory sub-system 702. NVMe queues 760 of the host 704 can trigger a doorbell register when the command is ready to execute, where the controller 506 picks up the queue entries in the order received, or in the order of priority.

The controller 706 receives the respective commands from the host 704, where each respective command comprises a command portion and a status indicator portion as discussed herein (e.g., the status indicator portion in the memory command slots of the memory device include a memory device status ID for each command in the memory). The controller 706 also allocates controller command slots to store a host status ID for each command in the controller. From each command there is generated an NVMe queue entry in the NVMe Queues 760, where each of the NVMe queue entries are associated with one status queue entries, which is allocated and maintained in the host memory device 758 as status queues. To accomplish this, the NVMe driver 752 allocates command slots in the host memory device 758 to allow the status indicator information associated with the respective commands to be stored in the status queues associated with each of the commands.

As discussed herein, the status indicator portion comprises the host status ID or the device status ID, which are shown in FIG. 3. The host 704 updates a current status of a command in the host status command slot and the memory device 702 updates the current status of the command in the device status command slot. To create and initialize the host status ID and the device status ID for the status queues, the host 704, the memory sub-system 702, the NVMe driver 752 and/or the memory device 716 may use vendor specific command approach to create and initialize these queues. In some embodiments, the controller 706 and/or the NVMe driver 752 can also utilize a vendor specific command in the status indication portion (e.g., the device status ID) associated with the respective commands of the status queue. These status queues can be exposed to the host 704 and/or the NVMe driver 752 through the base address registers 746, which allows the host 704 to read the memory sub-system 702 and the memory device 516 and/or the memory sub-system 702 to read the host memory 758 metadata information and/or to write host 504 or memory sub-system 702 metadata information about the specific command. The host 704 may, however, need to preform additional reading and writing to the command slots on the memory sub-system 702 for every command request. But this can be configured to occur during a failure scenario so as to better avoid a performance bottleneck.

As seen in FIG. 7, the status indicator portion in the memory sub-system command slots 730-1 through 730-N of the memory device 716 include, for each command the memory device status ID (contained in the memory sub-system status command slot 530-1-530-N for the memory sub-system 702). Similarly, the status indicator portion in the host memory command slots 728-1 through 728-N of the host memory device 758 include, for each command the host device status ID (contained in the host status command slot 528-1-528-N for the host memory 758). In other words, the status indicator portion in the memory command slots of the memory device 516 includes a memory device status ID for the memory and the status indicator portion in the host command slots of the host memory 758 includes the host status ID for each command.

According to the present disclosure, the controller 706 can determine that an interrupt signal is asserted during processing of at least one of the respective commands, where the interrupt signal is indicative of a change in at least one status indicator portion of at least the one of the respective commands. For example, when the controller 706, in processing at least one of the respective commands, determines that the interrupt signal is asserted by the controller 706, the controller 706 changes the host status ID for the at least one of the respective commands. This can be accomplished because the host 704 NVMe driver 752 maps the status queues and starts updating the host status command slot 728 based on token ID configuration for every command. The controller 706 maps address information associated with the allocated command slots associated with the memory device, and more specifically, the status command slots 728 in the base address registers 746. In this way, the base address registers 746 can be considered a pseudo lookup table to map the status command slots 728 for quick location. Similarly, when the memory sub-system 702 determines that the interrupt signal is asserted, the memory sub-system 702 causes the change in the memory device status ID. In other words, the device updates the device status command slot based on token ID configuration for every command.

The controller 706 then reads at least the one status indicator portion of at least the one of the respective commands that experienced the change responsive to the interrupt signal. For the embodiments, the controller 706 shares the base address register 746 region for the controller command slots of the controller 706 with the memory device 758. For the various embodiments, the controller 706 reads the memory device status ID by accessing the base address register 746 region of the memory sub-system 702 after the interrupt signal is asserted during processing of at least one of the respective commands. The controller 706 reads the memory device status ID by accessing a base address register region 746 of the memory sub-system 702 after the interrupt signal is asserted during processing of at least one of the respective commands. For the various embodiments, the controller 706 makes the change in at least one status indicator portion of at least the one of the respective commands by accessing a base address register region 746.

The controller 706 then causes a failure associated with a command slot allocated to at least the one of the respective commands to be resolved prior to initiation of a timeout process by the host computing device 704. For the various embodiments, the controller 706, in causing the failure associated with the command slot to be resolved prior to initiation of a timeout process, uses an interrupt handler to correct the failure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "associating" or "assigning" or "aborting" or "deleting" or "appending" or "identifying" or "comparing" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
submitting, by a host, a command to a memory sub-system;
assigning for the command a host status indicator (ID) for the host and a memory device status ID for a memory device of the memory sub-system in at least one of a status command slot related to the command;
determining that an interrupt signal is asserted during processing of the command, wherein the interrupt signal is indicative of a change in at least one of the host status ID and the memory device status ID;
reading at least one of the host status ID and the memory device status ID from the status command slot by accessing a base address register region after determining that the interrupt signal is asserted; and
correcting, based on information read in at least one of the host status ID and the memory device status ID, a failure in at least one of the host and device based on the reading prior to initiation of a timeout process.

2. The method of claim 1, wherein the at least one of the status command slot related to the command is a memory device status command slot, wherein assigning the host status ID and the memory device status ID are both done in the memory device status command slot.

3. The method of claim 1, wherein reading the at least one of the host status ID and the memory device status ID after the interrupt signal involves accessing the base address register region of the memory device.

4. The method of claim 1, wherein the change in at least one of the host status ID and the memory device status ID involves accessing the base address register region.

5. The method of claim 1, further including the memory sub-system allocating memory for the status command slot; and
mapping the status command slot of the allocated memory in the base address register region.

6. The method of claim 1, further including using vendor specific commands in the host status ID and the memory device status ID.

7. The method of claim 1, wherein determining that the interrupt signal is asserted is done by the host in processing the command, wherein the host causes the change in at least the host status ID.

8. The method of claim 1, wherein determining that the interrupt signal is asserted is done by the memory device, wherein the memory device causes the change in at least the memory device status ID.

9. The method of claim 1, wherein correcting the failure in at least one of the host and device based on the reading prior to initiation of the timeout process includes executing an interrupt handler to correct the failure.

10. The method of claim 1, wherein the at least one of the status command slot related to the command includes a memory device status command slot associated with the memory device and a host status command slot associated with the host, wherein assigning the host status ID is done in the host status command slot and assigning the memory device status ID is done in the memory device status command slot.

11. The method of claim 10, wherein the host shares the base address register region for the host status command slot with the device.

12. The method of claim 11, wherein the memory sub-system maps the host status command slot through the base address register region associated with the memory sub-system.

13. The method of claim 10, wherein assigning the memory device status ID is done in the memory device status command slot by the host.

14. The method of claim 10, wherein the host updates a current status of the command in the host status command slot and the memory sub-system updates the current status of the command in the memory device status command slot.

15. An apparatus, comprising:
a memory device; and
a controller coupled to the memory device, wherein the controller is configured to:
receive respective commands each comprising a command portion and a status indicator portion;
allocate memory command slots of the memory device to store the status indicator portion associated with the respective commands;
determine that an interrupt signal is asserted during processing of at least one of the respective commands, wherein the interrupt signal is indicative of a change in at least one status indicator portion of at least the one of the respective commands;
read at least the one status indicator portion of at least the one of the respective commands that experienced the change from the memory command slots by accessing a base address register region responsive to the interrupt signal; and
cause a failure associated with a command slot allocated to at least the one of the respective commands to be resolved prior to initiation of a timeout process.

16. The apparatus of claim 15, wherein the status indicator portion in the memory command slots of the memory device include both a host status indicator (ID) for the controller and a memory device status ID for the memory for each command.

17. The apparatus of claim 16, wherein the controller reads the memory device status ID by accessing the base address register region of the memory device after the interrupt signal is asserted during processing of at least one of the respective commands.

18. The apparatus of claim 17, wherein when the controller in processing at least one of the respective commands determines that the interrupt signal is asserted by the controller, the controller changes the host status ID for the at least one of the respective commands.

19. The apparatus of claim 16, wherein the memory device determines that the interrupt signal is asserted, the memory device causes the change in the memory device status ID.

20. The apparatus of claim 15, wherein the status indicator portion in the memory command slots of the memory device include a memory device status ID for each command in the memory; and
the controller allocates controller command slots to store a host status ID for each command in the controller.

21. The apparatus of claim 20, wherein the controller shares the base address register region for the controller command slots of the controller with the memory device.

22. The apparatus of claim 20, wherein the controller maps the controller command slots of the controller through the base address register region associated with the memory device.

23. The apparatus of claim 20, wherein the controller assigns the memory device status ID.

24. The apparatus of claim 20, wherein the host updates a current status of a command in the host status command slot and the memory device updates the current status of the command in the device status command slot.

25. The apparatus of claim 15, wherein the controller makes the change in at least one status indicator portion of at least the one of the respective commands by accessing the base address register region.

26. The apparatus of claim 15, wherein the controller maps the allocated command slots in the base address register region.

27. The apparatus of claim 15, wherein the controller uses a vendor specific command in the status indicator portion associated with the respective commands.

28. The apparatus of claim 15, wherein the controller in causing the failure associated with the command slot to be resolved prior to initiation of a timeout process uses an interrupt handler to correct the failure.

29. A system, comprising:
a host computing device; and
a memory sub-system coupled to the host computing device, wherein the memory sub-system comprises:
a memory device; and
a controller coupled to the memory device, wherein the controller is configured to:
receive respective commands from the host computing device, wherein each respective command comprises a command portion and a status indicator portion;
allocate command slots of the memory device to store the status indicator information associated with the respective commands, wherein the status indicator portion comprises a host status indicator (ID) or a device status ID;
determine that an interrupt signal is asserted during processing of at least one of the respective commands, wherein the interrupt signal is indicative of a change in at least one status indicator portion of at least the one of the respective commands;
read at least the one status indicator portion of at least the one of the respective commands that experienced the change from the command slots by accessing a base address register region responsive to the interrupt signal; and
cause a failure associated with a command slot allocated to at least the one of the respective commands to be resolved prior to initiation of a timeout process by the host computing device.

30. The system of claim 29, wherein the status indicator portion in the memory command slots of the memory device include both a host status indicator (ID) for the controller and a memory device status ID for the memory for each command.

31. The system of claim 30, wherein the controller reads the memory device status ID by accessing the base address register region of the memory device after the interrupt signal is asserted during processing of at least one of the respective commands.

32. The system of claim 31, wherein when the controller in processing at least one of the respective commands determines that the interrupt signal is asserted by the controller, the controller changes the host status ID for the at least one of the respective commands.

33. The system of claim 30, wherein the memory device determines that the interrupt signal is asserted, the memory device causes the change in the memory device status ID.

34. The system of claim 29, wherein the status indicator portion in the memory command slots of the memory device include a memory device status ID for each command in the memory; and
the controller allocates controller command slots to store a host status ID for each command in the controller.

35. The system of claim 29, wherein the controller shares the base address register region for the controller command slots of the controller with the memory device.

36. The system of claim 29, wherein the controller maps the controller command slots of the controller through the base address register region associated with the memory device.

37. The system of claim 29, wherein the controller assigns the memory device status ID.

38. The system of claim 29, wherein the host updates a current status of a command in the host status command slot and the memory device updates the current status of the command in the device status command slot.

39. The system of claim 29, wherein the controller makes the change in at least one status indicator portion of at least the one of the respective commands by accessing the base address register region.

40. The system of claim 29, wherein the controller maps the allocated command slots in the base address register region.

41. The system of claim 29, wherein the controller uses a vendor specific command in the status indicator portion associated with the respective commands.

42. The system of claim 29, wherein the controller in causing the failure associated with the command slot to be resolved prior to initiation of a timeout process uses an interrupt handler to correct the failure.

* * * * *